(12) United States Patent
Swearingen et al.

(10) Patent No.: US 8,942,882 B2
(45) Date of Patent: Jan. 27, 2015

(54) VEHICLE HEALTH MANAGEMENT SYSTEMS AND METHODS

(75) Inventors: Kevin Swearingen, St. Charles, MO (US); Kirby J. Keller, Chesterfield, MO (US)

(73) Assignee: The Boeing Company, Chicago, IL (US)

( * ) Notice: Subject to any disclaimer, the term of this patent is extended or adjusted under 35 U.S.C. 154(b) by 1539 days.

(21) Appl. No.: 11/761,922

(22) Filed: Jun. 12, 2007

(65) Prior Publication Data

US 2010/0017049 A1 Jan. 21, 2010

Related U.S. Application Data

(63) Continuation-in-part of application No. 10/884,553, filed on Jul. 2, 2004, now abandoned.

(51) Int. Cl.
*G06F 7/00* (2006.01)
*G06F 19/00* (2011.01)
*G07C 5/08* (2006.01)
*B60R 16/023* (2006.01)
*G08G 5/00* (2006.01)

(52) U.S. Cl.
CPC ............ *G07C 5/0816* (2013.01); *G07C 5/0808* (2013.01); *B60R 16/0232* (2013.01); *G08G 5/0021* (2013.01); *G07C 5/0841* (2013.01); *B60R 16/0234* (2013.01)
USPC .......... 701/29.1; 701/3; 701/8; 701/9; 701/10; 701/14; 701/32.1; 701/34.3; 340/438; 340/439; 340/500; 244/17.13; 244/75.1; 244/99.2

(58) Field of Classification Search
CPC .. G07C 5/0808; G07C 5/0816; G07C 5/0841; B60R 16/0232; B60R 16/0234
USPC ............... 701/3, 8–10, 14, 29, 30, 33, 35, 36; 340/438, 439, 500, 501, 506, 517, 945, 340/963, 971; 244/17.13, 75.1, 99.2
See application file for complete search history.

(56) References Cited

U.S. PATENT DOCUMENTS

| | | | |
|---|---|---|---|
| 4,215,412 A * | 7/1980 | Bernier et al. | 701/100 |
| 5,343,703 A | 9/1994 | Kamimura | |
| 5,383,133 A * | 1/1995 | Staple | 700/280 |
| 5,550,731 A | 8/1996 | Jackson | |
| 5,550,736 A | 8/1996 | Hay et al. | |
| 5,615,119 A * | 3/1997 | Vos | 701/4 |
| 5,638,277 A | 6/1997 | Nagai | |
| 5,806,805 A * | 9/1998 | Elbert et al. | 244/195 |
| 6,014,598 A * | 1/2000 | Duyar et al. | 702/58 |
| 6,128,554 A | 10/2000 | Damotte | |
| 6,349,900 B1 | 2/2002 | Uttley et al. | |
| 6,367,031 B1 | 4/2002 | Yount | |
| 6,532,412 B2 * | 3/2003 | Adibhatla et al. | 701/100 |
| 6,622,972 B2 * | 9/2003 | Urnes et al. | 244/194 |

(Continued)

*Primary Examiner* — Jack W Keith
*Assistant Examiner* — Chuong P Nguyen
(74) *Attorney, Agent, or Firm* — Toler Law Group, PC (57) ABSTRACT

Systems and methods for managing the exchange of vehicle information between software modules with different safety importance. In one embodiment, a vehicle health management system includes a mission critical software module, a flight critical software module and a gatekeeper. The mission critical software module receives vehicle state information and provides it to the flight critical software module if the gatekeeper confirms the validity of the vehicle information.

13 Claims, 11 Drawing Sheets

(56) References Cited

U.S. PATENT DOCUMENTS

| | | |
|---|---|---|
| 6,643,569 B2 * | 11/2003 | Miller et al. .................. 701/29 |
| 6,646,397 B1 * | 11/2003 | Discenzo ............... 318/400.07 |
| 6,650,973 B2 | 11/2003 | Yamamoto |
| 6,694,235 B2 | 2/2004 | Akiyama |
| 6,738,696 B2 | 5/2004 | Oi |
| 6,928,345 B2 * | 8/2005 | Quinn ........................ 701/32.1 |
| 7,017,861 B1 | 3/2006 | Johansson et al. |
| 7,251,550 B2 * | 7/2007 | Eschborn et al. .............. 701/29 |
| 2001/0016789 A1 | 8/2001 | Staiger |
| 2001/0042229 A1 * | 11/2001 | James ........................... 714/48 |
| 2002/0026278 A1 * | 2/2002 | Feldman et al. ............. 701/117 |
| 2003/0033178 A1 * | 2/2003 | Black et al. ..................... 705/7 |
| 2003/0076221 A1 | 4/2003 | Akiyama et al. |
| 2003/0120399 A1 * | 6/2003 | Yamamoto ...................... 701/4 |
| 2004/0176885 A1 | 9/2004 | Quinn |
| 2005/0080593 A1 | 4/2005 | Blaser |
| 2005/0114090 A1 * | 5/2005 | Black et al. .................. 702/188 |
| 2005/0256682 A1 | 11/2005 | Galutia et al. |
| 2005/0267655 A1 | 12/2005 | Gessner |
| 2005/0273653 A1 | 12/2005 | Zubkow |
| 2006/0004499 A1 | 1/2006 | Trego et al. |
| 2006/0020378 A1 * | 1/2006 | Salman et al. ................. 701/29 |
| 2006/0020379 A1 * | 1/2006 | Salman et al. ................. 701/29 |
| 2009/0210104 A1 * | 8/2009 | Bernard et al. .................. 701/3 |

* cited by examiner

VEHICLE HEALTH MANAGEMENT SYSTEMS AND METHODS

REFERENCE TO EARLIER APPLICATION

This is a continuation in part of U.S. patent application Ser. No. 10/884,553, filed Jul. 2, 2004.

GOVERNMENT LICENSE RIGHTS

This invention was made with Government support under U.S. Government contract F33615-01-2-3152. The Government has certain rights in this invention.

FILED OF THE DISCLOSURE

This disclosure relates to vehicle health management and more specifically, to vehicle health management systems and methods and their integration with vehicle flight control systems.

BACKGROUND

Aircraft software is typically verified and validated to ensure that it performs reliability and according to its software requirements specification. As aircraft have evolved and become more complex, software verification and validation costs have increased significantly.

One solution to high software verification and validation costs is to segregate the vehicle control software into groups (i.e., flight critical, mission critical and maintenance critical software) and perform a less rigorous or comprehensive verification and validation of the less safety-critical software.

Flight critical (FC) systems typically include the components and software associated with controlling the vehicle, and are the most safety critical vehicle systems. While mission critical (MC) systems typically include the components and software associated with a vehicle's guidance, navigation and health monitoring functions. Although the mission critical systems are important to ensure that the vehicle achieves its mission objectives, they are less safety-critical then the FC systems. Therefore, FC software typically receives a rigorous and comprehensive validation and verification, while MC software receives a less rigorous validation and verification. Because of this difference in verification and validation, the FC and MC systems are partitioned and communication between these software modules is severely limited.

However, both the FC and MC systems monitor and respond to the status and health of the vehicle. The FC system typically monitors a narrow set of gross system and component data such as actuator power thresholds, fuel pump controller power and high-level radar operating status checks. While the MC system typically monitors a more comprehensive and higher fidelity set of system and component data such as actuator power efficiency, radar mode performance and fuel pump outflow pressures. Improved communication between software modules of different criticality levels may therefore provide utility.

SUMMARY

Embodiments of vehicle health management systems and methods are disclosed. Embodiments in accordance with the teachings of the present disclosure may advantageously provide improved health monitoring, and improved capability and performance, in comparison with the prior art.

In one aspect, a vehicle health management system includes a mission critical software module and a flight critical software module. The mission critical software module receives vehicle information, and determines one or more of a risk value, a confidence value or a benefit value based on the vehicle information. The flight critical software module calculates a health score based on one or more of the risk value, the confidence value or benefit value and compares the health score to a threshold value. The flight critical software module filters the vehicle information to determine whether the information is internally consistent, externally consistent or stable over time. The flight critical software module provides the vehicle information to a vehicle flight control system based on the health score and whether the vehicle information is internally consistent, externally consistent or stable over time In another aspect, a method of managing vehicle health information comprising receiving vehicle information by a mission critical software module. The mission critical software module determines a risk value associated with the vehicle information, a confidence value associated with whether the vehicle information matches a validated vehicle state and a benefit value associated with providing the vehicle information to a flight critical software module. The method further includes calculating a health score based on one or more of the risk value, confidence value or benefit value, and filtering the vehicle information to determine if the vehicle information is internally consistent, externally consistent or stable over time. The vehicle information is provided to a flight critical software module based on the health score, and whether the vehicle information is internally consistent, externally consistent or stable over time.

The features, functions, and advantages that have been discussed above or will be discussed below can be achieved independently in various embodiments, or may be combined in yet other embodiments, further details of which can be seen with reference to the following description and drawings.

BRIEF DESCRIPTION OF THE DRAWINGS

The teachings are described with reference to the accompanying figures. In the figures, the left-most reference number digit identifies the figure in which the reference number first appears. The use of the same reference numbers in different figures indicates similar or identical items.

DETAILED DESCRIPTION

Figure 1:
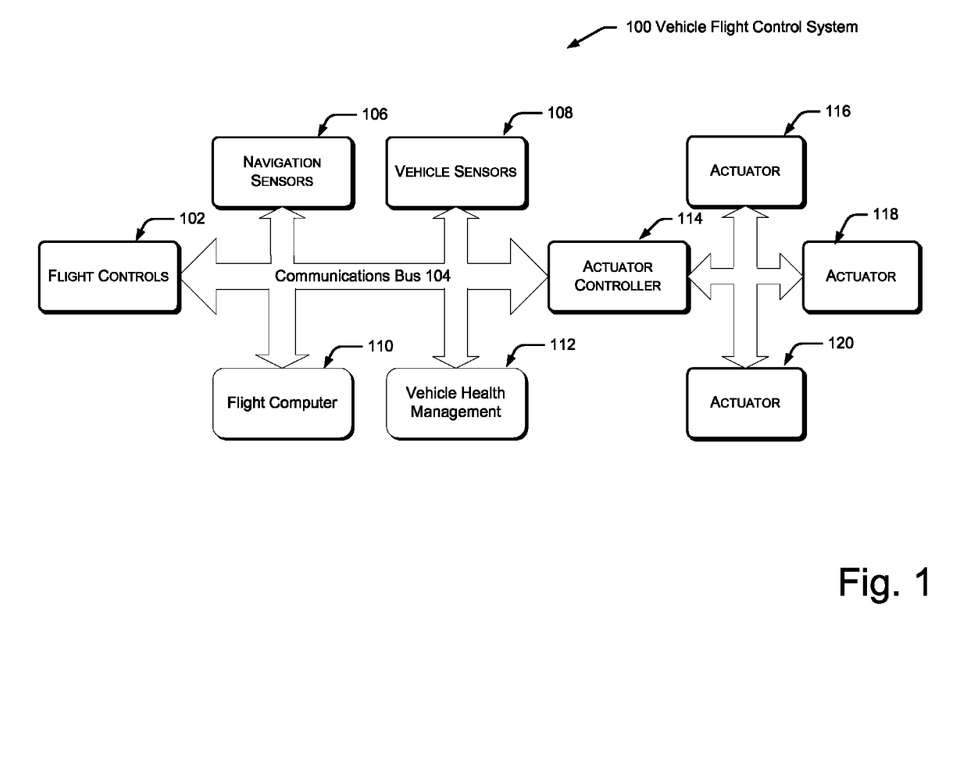
FIG. 1 is a block diagram of an exemplary vehicle flight control system.

FIG. 1 illustrates an exemplary vehicle flight control system 100 that maybe found in military and commercial aircraft, helicopters, pilot-less or unmanned aerial vehicles, or other types of aircraft. As shown in FIG. 1, the flight control system 100 includes; flight controls 102 for inputting flight commands, a communications bus 104 for communicating with the various components of the flight control system 100, navigation sensors 106 for determining the position and orientation of the vehicle, vehicle sensors 108 for detecting the speed, condition, etc. of the vehicle, a flight computer 110 for controlling the vehicle based on inputs from the flight controls 102, a vehicle health management system 112 for monitoring the health of the vehicle, an actuator controller 114 for controlling the vehicle's actuators 116-120 based on commands from the flight computer 110, and actuators 116-120 for actuating and controlling the vehicle's flight control surfaces (not shown).

The flight computer 110 creates or generates command signals based on inputs by a pilot via the flight controls 102, a computer program, a ground controller, or other suitable source of flight control inputs. These commands are sent via the communications bus 104 to the flight computer 110 which in turn send a command to the actuator controller 114, which commands the one or more actuators 116-120. The actuators 116-120 receive the command(s) and respond by moving the appropriate flight control surfaces (not shown). The flight control surfaces may include ailerons, flaps, leading edge slats, spoilers, a horizontal stabilizer, elevators, rudders, or other suitable aircraft control effectors. Although only three actuators are shown 116-120, aircraft typically employ many actuators to control their flight control surfaces and perform other functions.

The vehicle health management system 112 is shown as a separate component and may include a microprocessor, a computer memory and computer software (not shown). Although shown as a separate component or system, the vehicle health management system 112 could be implemented as part of the flight computer 110, as software processed by one or more microprocessors, or other suitable means of implementation.

Figure 2:
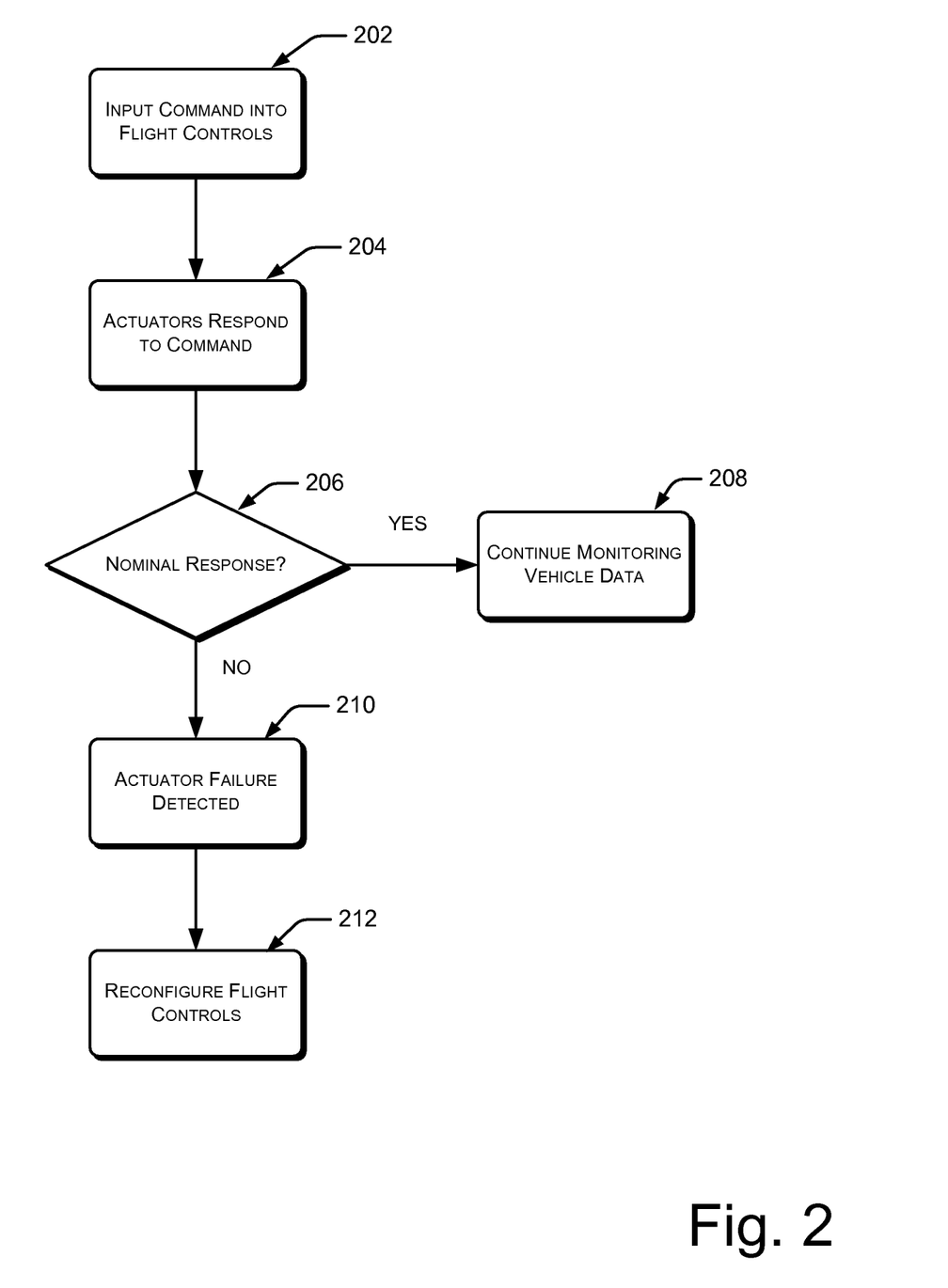
FIG. 2 is a block diagram of a method of detecting an actuator failure and reconfiguring the aircrafts flight controls.

FIG. 2 illustrates a method of detecting an actuator failure and reconfiguring the vehicle's flight controls to compensate for the actuator failure. The method is illustrated as a collection of blocks in a logical flow graph, which represents a sequence of operations that can be implemented in hardware, software, or a combination thereof. In the context of software, the blocks represent computer instructions that, when executed by one or more processors, perform the recited operations. For convenience and clarity of illustration, the method is described with reference to the system 100 shown in FIG. 1.

At block 202, command is inputted into the flight controls and transmitted via the communications bus 104 to the flight computer 110. The flight computer 110 receives the command and responds by sending a command to the actuator controller 114. The actuator controller 114 receives the command from the flight computer 110 and sends one or more corresponding command signals to the actuators 116-120 associated with the appropriate flight control surface, at block 204. For example, the pilot may pull back on the stick to place the aircraft in a gentle climb. The flight computer 110 receives the pilot's input and sends the appropriate command via the data bus 104 to the actuator controller 114. The actuator controller 114 actuates actuators 116 and 118 which raise the aircraft's left and right elevators.

At block 206, the vehicle health management system 112 monitors the commands from the flight computer 110, the vehicle navigation sensors 106 (e.g., inertial measurement unit, air speed and altitude sensors) and other vehicle sensors 108 (e.g., actuator position) to detect an actuator 116-120 failure. The vehicle health management system 112 compares the flight computer command with the actuator position data to determine whether a nominal response from the actuator is detected, and if not, a failure is assumed to have occurred. For example, if the actuator position data corresponds to the command, the actuator has responded nominally and the vehicle health management system 112 continues to monitor vehicle data (e.g., flight commands, navigation sensors 106 and vehicle sensors 108), at block 208. Conversely, if the command does not correspond to the actuator's position, an actuator failure has occurred, at block 210. Alternatively (or additionally), the health management system 112 may compare the aircraft's actual response as measured by the vehicle's navigation sensors 106 (e.g., aircraft's pitch, roll or yaw sensors) with the vehicle's expected response based on the flight computer's command.

If the vehicle health management system 112 detects an actuator failure (block 210) it may verify the failure by performing a confirmation test. During a confirmation test the flight computer 110 sends one or more commands to actuate various control surfaces with the intent that they will cancel out one another and produce little or no aircraft motion. Specifically, the flight computer 110 sends commands to the suspect actuator 116-120 and other actuators 116-120 such that the aircraft is not expected to change course. However, if the navigation sensors 106 detect that the aircraft is changing course, the actuator failure is confirmed.

Once the vehicle health management system 112 has confirmed an actuator failure, the flight control algorithms are reconfigured to account for the actuator failure, at block 212. Alternatively, the vehicle health management system 112 may implement special commands for the functional actuators 116-120 to compensate for the failed actuator 116-120. These special commands may then be sent to the flight computer 110 which sends the commands to the functional actuators 116-120.

As previously noted, an aircraft's flight critical (FC) systems typically include the components and software associated with controlling the vehicle and are generally the most safety critical aircraft systems. The aircraft's mission critical (MC) systems include the components and software associated with a vehicle's guidance, navigation and health monitoring functions and are generally less safety critical. Therefore, the aircraft's FC software typically receives a rigorous and comprehensive validation and verification, while the MC software receives a less rigorous validation and verification. Because of this difference in verification and validation, the FC and MC systems in accordance with the prior art are partitioned and communication between the software modules is severely limited.

Figure 3:
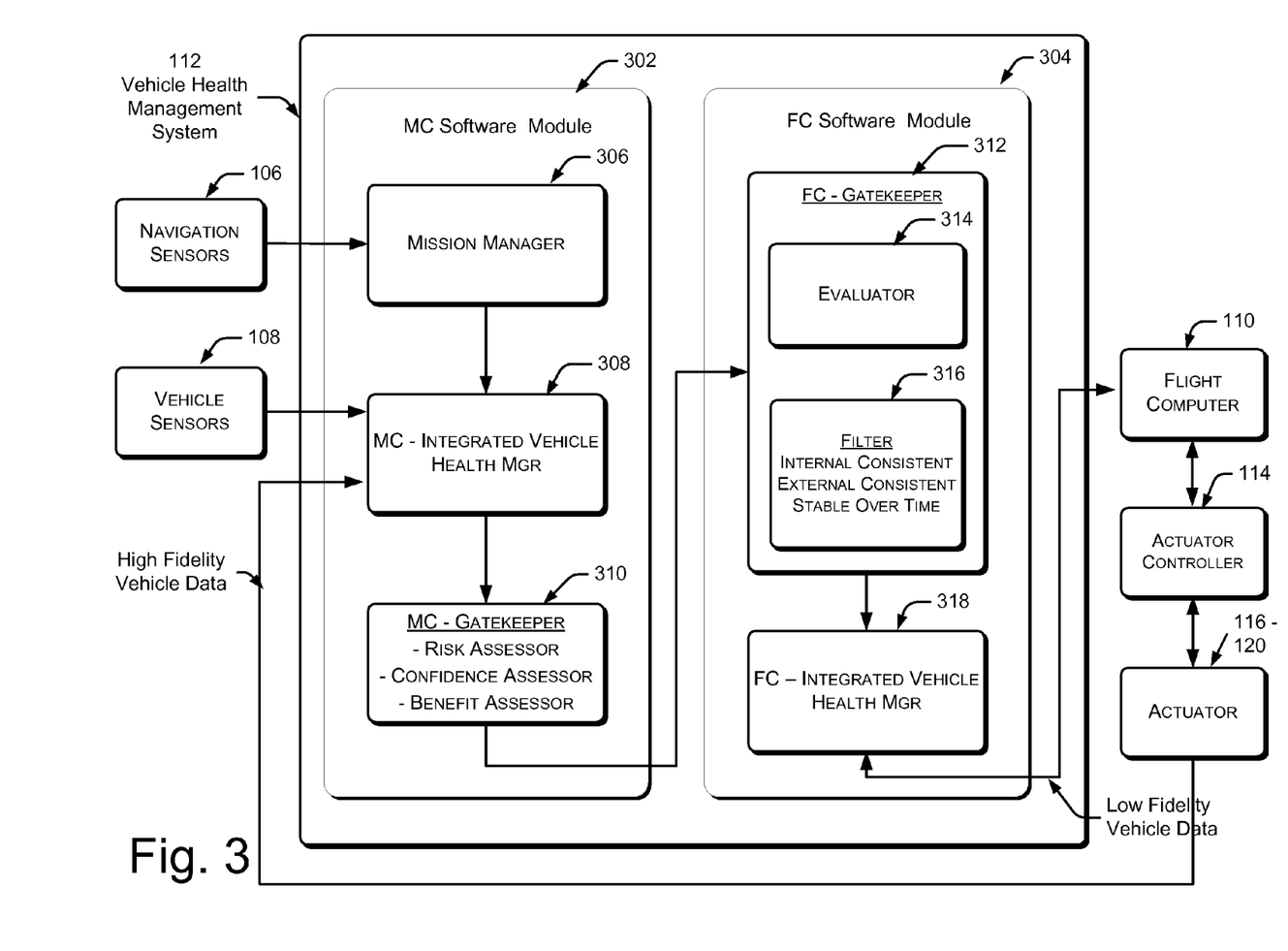
FIG. 3 is a block diagram of a vehicle health monitoring system in accordance with an embodiment.

FIG. 3 illustrates a vehicle health management system 112 in accordance with the teachings of the present disclosure. The vehicle health management system 112 includes a mission critical (MC) software module 302 and a flight critical (FC) software module 304.

The MC software module 302 monitors and responds to the state and health of the vehicle. The mission manager 306 receives vehicle state information from the vehicle's navigation sensors 106 and the vehicle's guidance system (not shown). The vehicle state information may include, for example, vehicle position, orientation, and velocities (e.g. up to six degrees of freedom). The mission critical integrated vehicle health manager (MC-IVHM) 308 receives the vehicle state information from the mission manager 306, vehicle sensor data 108 and high fidelity component data (e.g., actuator position, temperature, current draw, etc). Based on this information, the MC-IVHM 308 determines whether a component has failed or predicts whether a component will fail in the future.

As noted earlier, the mission critical software undergoes a less rigorous verification and validation than the flight critical software and communication between the software modules is limited. Therefore, the MC-IVHM's 308 determination or prediction of a component failure is verified by one or more gatekeepers (310-316) before the information is passed to the flight critical integrated vehicle health manager (FC-IVHM) 318 and acted upon by the vehicle's flight control system 100.

A MC gatekeeper 310 receives the vehicle state information, sensor data and high fidelity component data from the MC-IVHM 308 and calculates: 1) a risk value associated with operating the vehicle under the vehicle's current health state, 2) the benefit associated with reconfiguring the flight controls based on the vehicles health state (e.g., increased vehicle safety or capability) and 3) a confidence value based on how closely the vehicle's current state matches a validated (tested) vehicle state.

The risk value may be calculated based on a component failure modes and effects analysis (FMEA) which determines the impact to vehicle performance resulting from a degraded component. For example, a single motor failure in an actuator 116-120 equipped with redundant motors is inherently lower risk than an actuator 116-120 with a single motor. The risk value may also be sensitive to actuator usage; actuators 116-120 that are used infrequently typically have a lower effect on vehicle performance than actuators 116-120 that are used frequently. Moreover, the risk value may also be sensitive to the criticality of the control surface being actuated or function being performed since some actuators 116-120 perform functions that are more critical than others.

The benefit value indicates whether there is an increase in vehicle capability or safety by reconfiguring the flight controls based on the vehicle's current state. For example, a high actuator temperature may indicate degradation in actuator performance, and an impending actuator failure. By reducing the actuator's usage, the actuator's life may be prolonged and the failure avoided.

The confidence value is based on a comparison of the vehicle's current state and the vehicle's state when the mission critical software was verified and validated (tested). Similarities between the two vehicle states increase the confidence that the MC software module 302 is producing a valid result. Conversely, a large a difference between vehicle states reduces the confidence that the MC software module 302 is producing a valid result. For example, an actuator 116-120 maybe tested at different loads, temperatures, positions and actuation rates. If the suspect actuator 116-120 was verified and validated at its current state there is a high confidence that the output from the MC software module 302 is valid.

Figure 4:
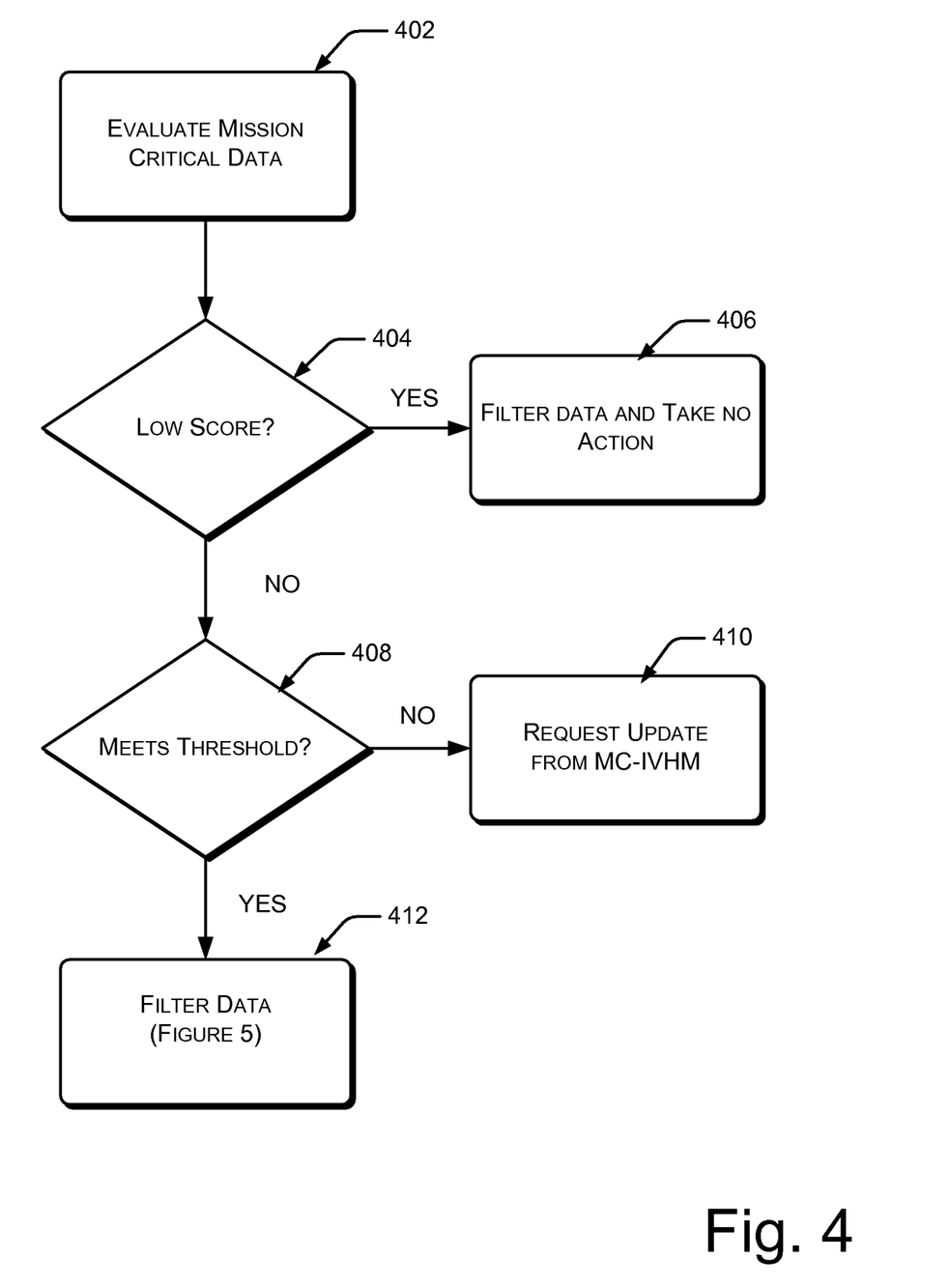
FIG. 4 is a block diagram of a method of evaluating vehicle information in accordance with another embodiment.

FIG. 4 is a block diagram of a method of evaluating vehicle information using the system shown in FIG. 3. In this embodiment, at block 402 the MC gatekeeper 310 sends the risk, benefit and confidence values to the FC software module 304. The evaluator 314, based on the risk, benefit and confidence values, calculates a health score using the following algorithm.

$$Y_i = e_{R_i} X_R + e_{C_i} X_C + e_{B_i} X_B$$

In this equation, Y is the health score, the X's are the risk, confidence, and benefit values, respectively, and the e's are the scale factors associated with the risk, confidence and benefit values.

At block 404, the health score (Y) is first screened to determine whether the score is valid. If the health score is extremely low, this indicates that the score is invalid, the vehicle data is filtered and the FC software module 304 doesn't take any further action, at block 406. However, if the health score is not a low score (score is valid), it is compared with a threshold value, at block 408. If the health score doesn't meet the threshold value, the evaluator 314 requests that the MC-IVHM 308 provide updated vehicle data, at block 410. Alternatively, if the health score meets or exceeds the threshold value, the vehicle data is transferred to the filter 316, at block 412.

Figure 5:
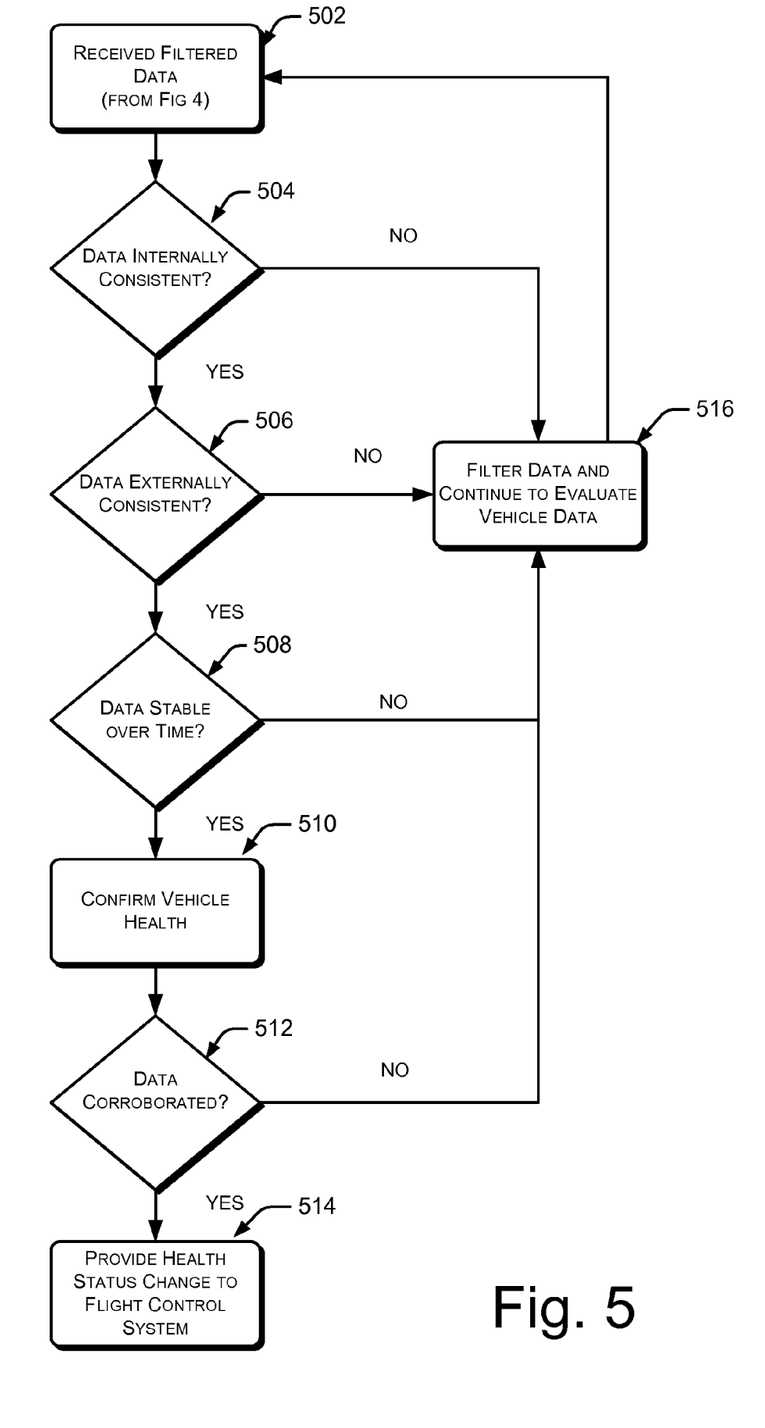
FIG. 5 is a block diagram of a method of filtering vehicle data in accordance with a further embodiment.

FIG. 5 shows an embodiment of a method of filtering vehicle data using the filter 316 in accordance with the teachings of the present disclosure. Referring to FIG. 5, in this embodiment the filter 316 evaluates the vehicle data to determine whether it is internally consistent, externally consistent, and stable over time. More specifically, at block 502, the filter 316 receives the vehicle data if the health score meets the threshold value.

At block 504, the filter 316 determines whether the vehicle data is internally consistent by confirming that the data fields are fully populated with values and the values are reasonable. For example, if the measurement is an analog measurement (e.g., actuator temperature measurement) and the data is presented in a digital format, the data is not internally consistent. If the data is internally consistent, the filter 316 then determines whether the data is externally consistent, at block 506. Alternatively, if the data is not internally consistent, the data is filtered and the FC software module 304 continues to evaluate the vehicle data, at block 516. The method then returns to block 502 to continue checking whether the data is internally consistent.

At block 506, the filter 316 then determines whether the high fidelity vehicle data is externally consistent. Since the MC software module 302 and FC software module 304 operate based on the same vehicle data, their results should be consistent. For example, if the vehicle data includes the position of an actuator 116-120, the MC software model 302 would receive high fidelity actuator data (e.g., actuator's actual position) while the FC software module 304 would receive low fidelity actuator data (e.g., an error message indicating the actuator was in the wrong position). Since both software modules are sensing the same actuator 116-120, the MC software module data should be externally consistent with the FC software module data. If the MC software module data is externally consistent (block 506), the vehicle data is then evaluated to determine whether it is stable over time, at block 508. Alternatively, if the MC software module data is externally inconsistent, the data is filtered and the FC software module 304 continues to evaluate the vehicle data, at block 516, and returns to block 504 to re-verify the consistency checks.

At block 508, the filter 316 then determines whether the vehicle data is consistent over time. For an actuator 116-120, the filter 316 looks at the actuator's data over a period of seconds or microseconds to determine whether the data has changed unexpectedly. For example, an actuator's temperature is generally stable over short periods of time (e.g., several minutes to a few hours). Therefore, if an actuator's temperature is fluctuating or changing rapidly, the measurement is probably erroneous. Alternatively, an aircraft's landing gear maybe evaluated over several missions which could correspond to several hours or days. If the high fidelity vehicle health data is stable over time, the FC-IVHM 318 evaluates the data, at block 510. Alternatively, if the high fidelity vehicle health data is inconsistent over time the data is filtered and the FC gatekeeper 312 continues to evaluate the vehicle data, at block 516, and returns to block 504 to re-verify the consistency checks.

At block 510, the FC-IVHM 318 analyzes the data from the various vehicle components to assess their health. For example, the FC-IVHM 318 may analyze an actuator's 116-120 temperature curves, current draw profiles and position data to determine the actuator's health. Specifically, the FC-IVHM 318 may compare the actuator's current draw vs. load curves with actuator failure mode data to predict when the actuator will fail. At block 512, the FC-IVHM 318 may verify the health of a vehicle component by performing a neural net correction factor test and/or parameter identification (PID) test.

During a neural net correction factor test, the vehicle flight control system 100 incorporates neural net correction factors into the flight control algorithms to compensate for unexpected vehicle responses (e.g., degradation of an actuator). The neural network software, residing in the flight computer 110, outputs a correction factor in the form of a vector representing pitch, roll, and yaw. The vectors are nominally zero or near-zero, and increase with the need for greater vehicle correction. For example, if a command intended to provide a 20 degree bank angle is received, and the aircraft responds with a 15 degree bank angle, a 5 degree correction factor is added to the vehicle's flight control algorithm. These correction factors are additional evidence that vehicle's performance has degraded.

The FC-IVHM 318 may also perform a parameter identification (PID) test to determine the vehicle's response to each actuator command. The vehicle's actual response is compared to the vehicle's expected response as predicted by a vehicle model. Any divergence between the vehicles actual and predicted responses are attributed to a specific control surface. For example, to isolate a specific control surface actuator 116-120, artificial excitations (e.g., small sinusoidal signals) are added to the position command for the specific actuator 116-120. Alternatively, the PID test could be performed when a control surface actuator 116-120 is responding to a specific command (e.g., 10 degrees left rudder).

Once the FC-IVHM 318 has verified the health of the component by performing a neural net correction factor and/or PID test, a correction based on the vehicle data is provided to the vehicle's flight control system 100, at block 512. If the actuator 116-120 has a total failure, the flight control system 100 is reconfigured to remove or isolate the actuator 116-120. However, if the actuator's 116-120 performance has simply degraded the flight control system 100 may compensate for the actuator's reduced capability by implementing a neural net correction factor or ramped capability reduction. A ramped capability reduction is performed by modifying the commands sent to the actuator 116-120 to reduce the stress on the actuator (e.g., moving the actuator slowly from one position to another position versus moving the actuator abruptly or rapidly from one position to another).

Figure 6:
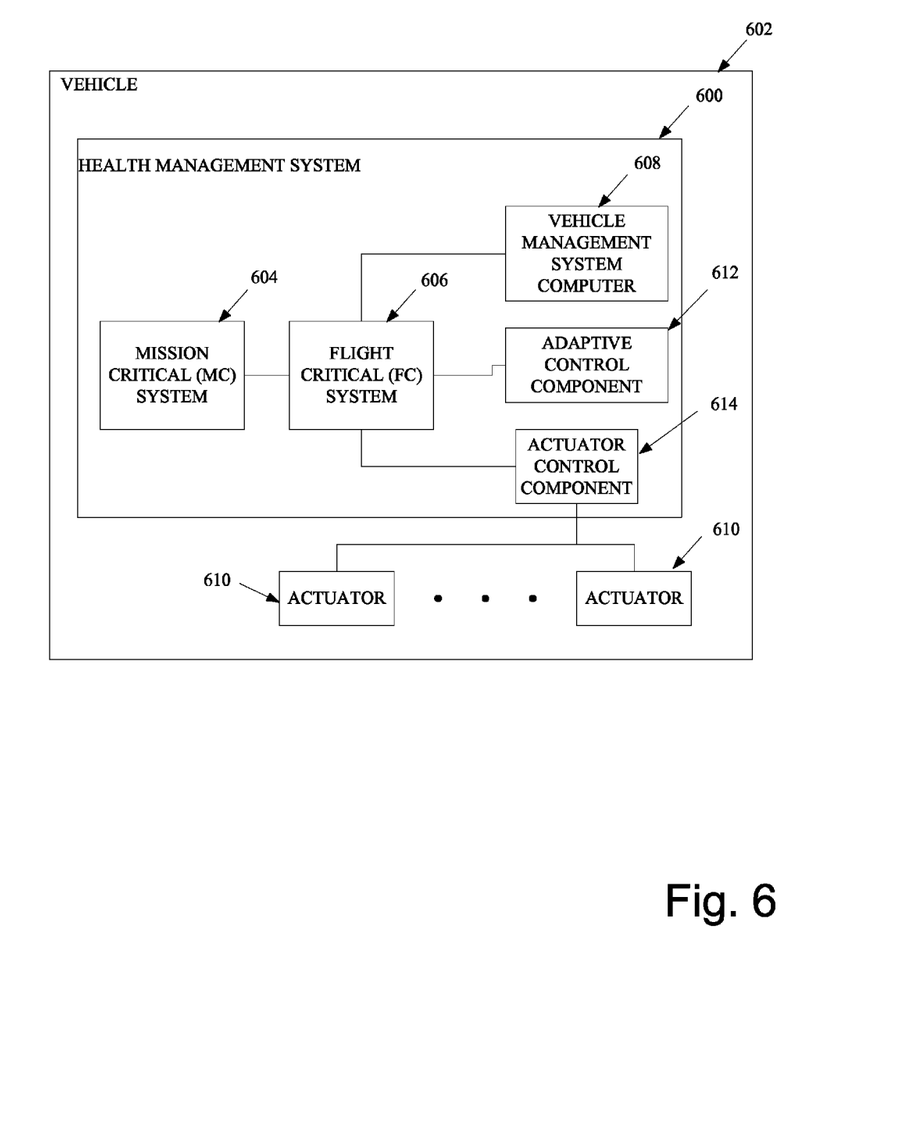
FIG. 6 illustrates a block diagram of an example vehicle and corresponding health management system formed in accordance with another embodiment.

It will be appreciated that a variety of systems and methods for monitoring and managing vehicle health may be conceived, and that the invention is not limited to the particular exemplary embodiments described above with reference to FIGS. 1-5. For example, FIG. 6 illustrates exemplary components of a vehicle health management system 600 in accordance with another embodiment in accordance with the teachings of the present disclosure. Example vehicles 602 include land, subsurface (or submersible), or air vehicles, or any vehicle that has a need to assess the health of actuators that control movement of control surfaces.

In this embodiment, the health management system 600 includes a mission critical (MC) system 604 and a control or flight critical (FC) system 606. The FC system 606 is in data communication with a vehicle management system computer 608, control surface actuators 610, and an adaptive control (AC) component 612. In one embodiment, the MC system 604 and FC system 606 are separate computer-based systems that include corresponding verified and validated MC and FC software applications. In the aviation community, verification and validation of FC software is typically more rigorous and complex than verification and validation for MC software, as mandated by Department of Defense and/or the Federal Aviation Authority. The health management system 600 includes software of such a nature that verification and validation would be prohibitively expensive or impossible to complete to a Flight Critical level. Prior to use, the MC software is validated and verified for a smaller subset of states.

The vehicle management system 608 sends various vehicle status information to the FC system 606. In one embodiment, example vehicle status information includes angle of attack, altitude, pitch, and air speed in the case where the vehicle is an aircraft. Other vehicle data may be retrieved by the vehicle management system 608 and delivered to the FC system 606 depending upon previous requirements or uses for the retrieved information. The actuator control component 612 retrieves information about each of the actuators 610 and sends that information to the FC system 606. The AC component 612 generates an error signal, such as an adaptive control correction factor (e.g., neural network correction factor), to the FC system 66.

Neural Net Correction Factor

The Adaptive Control flight control system can include neural nets that adapt to any unexpected vehicle response. The correction factor output which can be generated by neural network software is a vector representing pitch, roll, and yaw. The vectors are nominally zero or near-zero, and increase with the need for additional correction. The values of additional corrections are called adaptive control or neural net correction factors. These correction factors are provided to the FC system 606 as additional evidence that aircraft performance has degraded. The FC system 606 characterizes the correction factors as nominal or off-nominal. Off-nominal correction factors can be used by FC system 606 to initiate test injection, and by MC system 604 to validate information.

The FC system 606 sends the data and information received from the vehicle management system 608, the actuator control component 614, and the adaptive control component 612 to the MC system 604. The MC system 604 determines the health state for each of the actuators 610 based on the received data and information. The health state information is sent to the FC system 606. The FC system 606 evaluates the health state information of each of the actuators 610 and determines if adjustment of actuator control signals is necessary based on the evaluation. This is described in more detail below in FIGS. 7-10.

Figure 7:
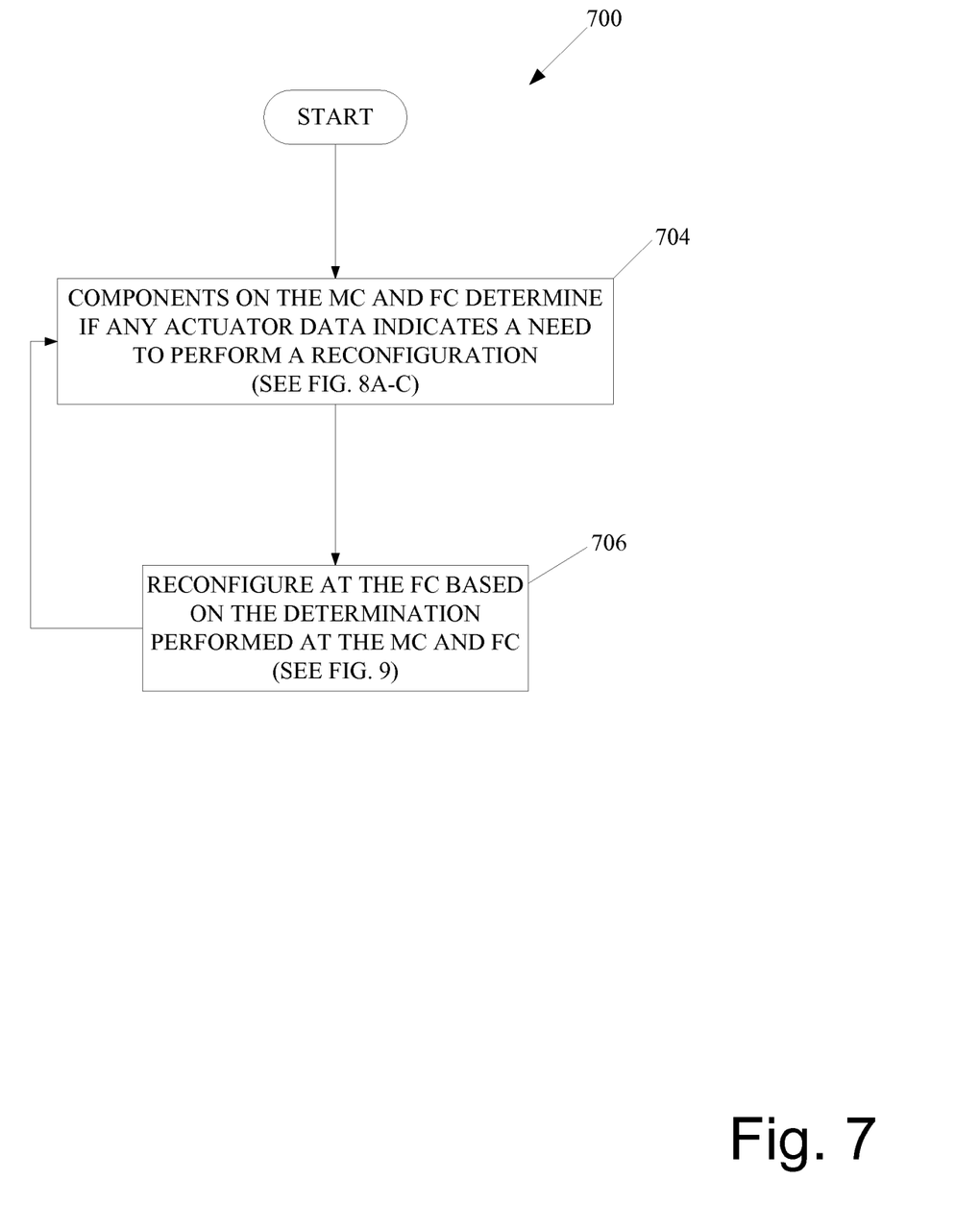
FIGS. 7-10 illustrate an exemplary process performed by the system shown in FIG. 6 for providing adaptive, responsive health management of a vehicle integrated with flight control laws.

FIG. 7 illustrates an exemplary process 700 performed by the health maintenance system 600 of FIG. 6. The process 700 is performed by software components of the MC and PC systems 604 and 606 that act as a gatekeeper between MC and FC software components of an Integrated Vehicle Health Management (IVHM) System. For ease in describing the present invention, the MC and FC systems 604 and 606 include the software that performs IVHM system functions and the process 700.

The process 700 begins at a block 704 where software components of the MC and FC systems 604 and 606 determine if any actuator data indicates a need to perform a reconfiguration. This process is described in more detail below in FIGS. 5A and 5B. At block 706, reconfiguration is performed based on the determination made at the block 704. After reconfiguration occurs at the block 706, the process 700 is repeated as necessary. Reconfiguration as shown on the block 706 is described in more detail below with regard to FIG. 9.

Figure 8A:
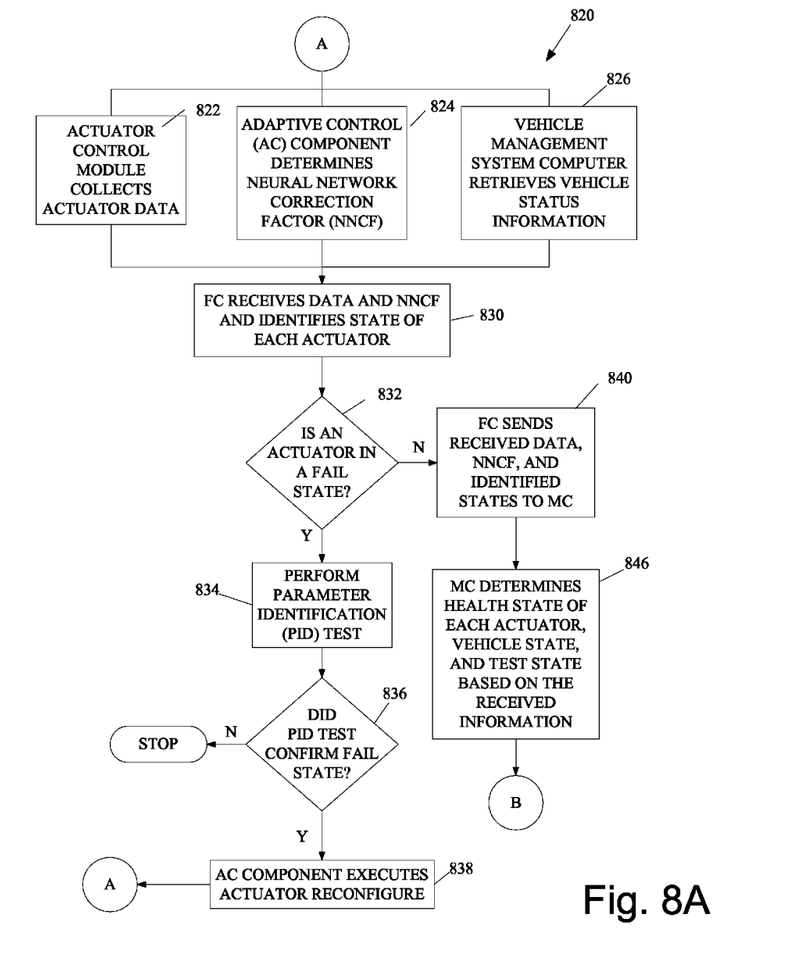

FIG. 5A illustrates an exemplary process 820 performed by the health management system 600 for performing the determination made at the block 704 of FIG. 7. The process 820 begins at blocks 822, 824, and 826. At a block 822, the actuator control component 614 collects data regarding the actuators 610. At the block 824, an adaptive control (AC) component determines a adaptive control correction factor (ACCF). At the block 826, the vehicle management system 608 retrieves various vehicle status information. The data retrieved or determined at the blocks 822-826 is sent to the FC system 606. The FC system 606 identifies the state of each of the actuators 610 based on the received data, at block 830.

At a decision block 832, the FC system 606 determines if an actuator 610 is in a fail state. If an actuator 610 is determined to be in a fail state, the FC system 606 performs a parameter identification (PID) test, at block 834. If it is determined at a decision block 836 that the PID test confirms the fail state of an actuator 610, then, at a block 838, the AC component 612 executes actuator reconfiguration. In other words, the FC system 606 redefines limits to flight critical inputs based on the determined failed actuator and sends actuator control instructions according to the redefined limits. If at the decision block 836 the PID test failed to confirm the previously identified fail state of the actuator, then the process 820 stops. If at the decision block 832 there are no actuators 610 in a fail state, the process 820 continues to a block 840 whereby the FC system 606 sends the information and data received at the block 830 to the MC system 604.

Figure 8B:
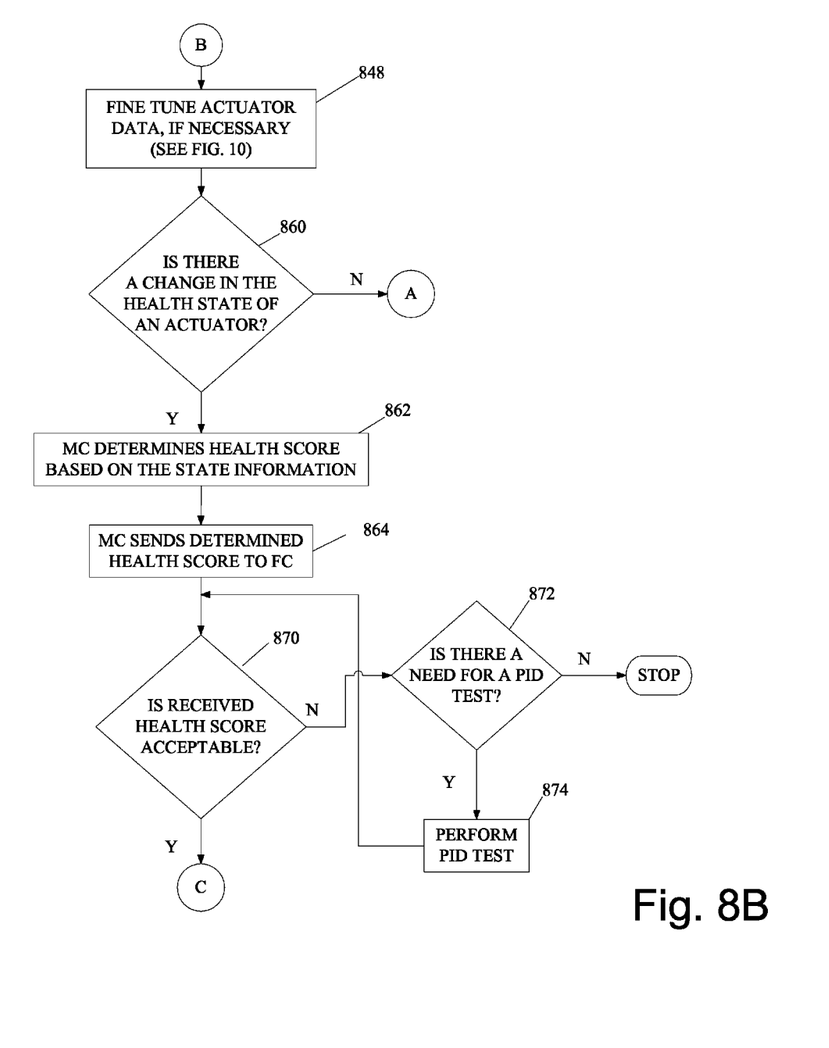

Referring now to FIG. 5B, after the MC system 604 receives the data and information from the FC system 606, then, at a block 846, the MC system 604 determines a health state for each actuator 610, a vehicle state, and a test state based on the received information.

In some embodiments, the MC IVHAM system may be most effective at determining the health of the actuators when the actuators are commanded with pre-defined sequences of commands, for example a low-frequency sine wave pattern. The vehicle may not be in a state conducive to injecting this test signal. The test state combines the need for such a test, permission to perform the test, and the detailed parameters of the requested test. At a block 848, the MC and FC systems 604 and 606 fine tune the data related to any actuator 610, if it is determined to be necessary. Fine tuning of actuator data is described in more detail below with regard to FIG. 10.

Next, at a decision block 860, the MC system 604 determines if there is a change in the health state of an actuator 610 that would possibly require a reconfiguration to occur. If the result of the decision block 860 is that there is not a significant change in the health state of an actuator 610, the process 820 returns to the beginning. If it is determined at the decision block 860 that there is a change in the health state of an actuator 610, then at a block 862, the MC system 604 determines a health score based on the determined state information. In one embodiment, the health score includes a risk component $X_R$, a confidence component $X_C$, and a benefit component $X_B$.

The risk component is based on failure modes and effects analysis, and captures the impact to performance of degraded states. For example, in an actuator with redundant motors, a single motor failure is inherently lower risk (to continued controlled flight) than a controller failure that may render an actuator inoperative. The risk evaluation is sensitive to current vehicle state, in that relatively low demand makes degraded performance less critical. Since some actuators drive control effectors that are more critical than others to maneuvering, the risk assessment is sensitive to the specific instantiation of the actuator component as well.

The benefit component is based on whether there is any previously quantified increase in vehicle capability or safety that would occur with an improvement made to any actuator control signals produced by the system 600. Specific health state information regarding the amount of performance degradation allows control reconfiguration. Reconfiguration improves efficiency and performance. For example, high temperatures are known to indicate degraded performance, and lead to catastrophic failure. Reduced usage of a surface prolongs usable life, allows cooling and may avoid failure. The benefit component is dependent on vehicle state, since extended usable life, capability maximization, and safety may not be priorities under certain conditions.

The confidence component is based on comparison of the current state of the actuators and aircraft to the conditions under which the software was verified and validated (V&V) prior to installation. Any similarity increases confidence that the software is producing valid accurate output, while a large difference between the current condition and any tested condition decreases the confidence that the software is producing valid output. The V&V conditions are captured in a table that this component exercises. For actuators, critical test parameters typically include load, temperature, position, velocity, and acceleration.

At a decision block 864, the MC system 604 sends the determined health score, the test state, and the health state to the FC system 606. At a decision block 870, the FC system 606 determines if the received health score is acceptable for the purposes of performing a reconfiguration, using Equation (1) above (i.e. $Y_i = e_{Ri}X_R + e_{Ri}X_C + e_{Bi}X_B$), and Equation (2) below:

$$\text{Is } Y_i > a \text{ threshold } i? \tag{2}$$

If the received health score does not exceed the threshold value, the information is not provided to the FC system 606, and the information that was rejected is returned to the MC system 604. If the health score surpasses the threshold value, the inherent value of the information has been deemed to warrant its use for FC system 606, even though its source is the lower confidence MC system. Even so, confirmation is required under certain circumstances.

The filter component includes a set of FC system 606 assets that may be able to confirm information from MC system 604. These assets include Parameter Identification (PID), the ACCF, and the FC system sensors and electronics. Based on vehicle state, health state, and test state, the filter element may invoke any combination of these assets. For instance, the MC system 604 may report a slight rate limitation in a single actuator. Even though it is relatively benign and useful to reconfigure as a result, if the vehicle is in a benign state (i.e. straight and level flight) it may increase confidence that the identified state is accurate if a PID test is run.

If it is determined at block 872 there is a need for a PID test, then the FC system 606 performs a PID test at block 874, and returns to the decision block 870 after the test is complete. In some embodiments, the PID test injects a test appropriate for the indicated degradation and vehicle state. For example, it may inject a very short sharp perturbation (or "wiggle") onto each control surface and monitor the response of the vehicle. It is relatively straightforward to compare the vibrational modes received to the expected values and identify an anomalous response. This confirmation allows the filter component to pass the MC system information, as illustrated in the process 978 of FIG. 9.

Figure 9:
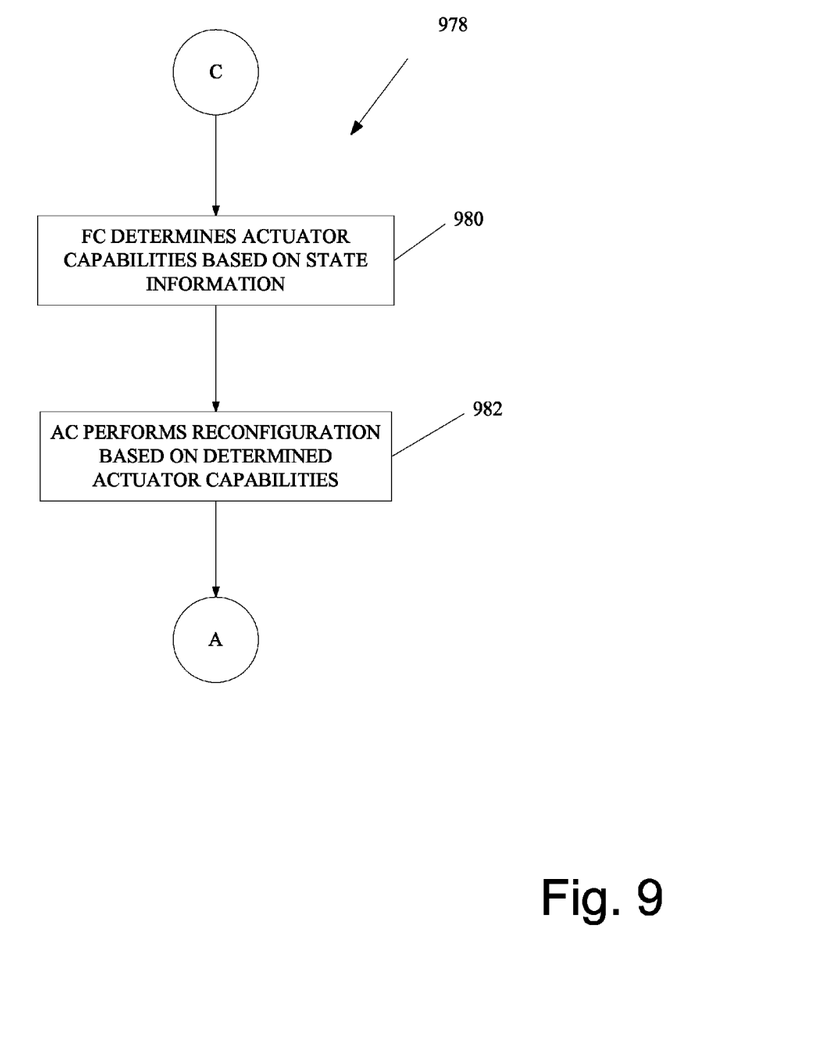

As shown in FIG. 9, at a block 980, the filter component determines actuator capabilities based on received state information. At a block 982, the AC component 612 performs reconfiguration based on the determined actuator capabilities. After reconfiguration, the process 978 returns to the beginning for continual analysis of actuators 610 and any further necessary reconfiguration.

Figure 10:
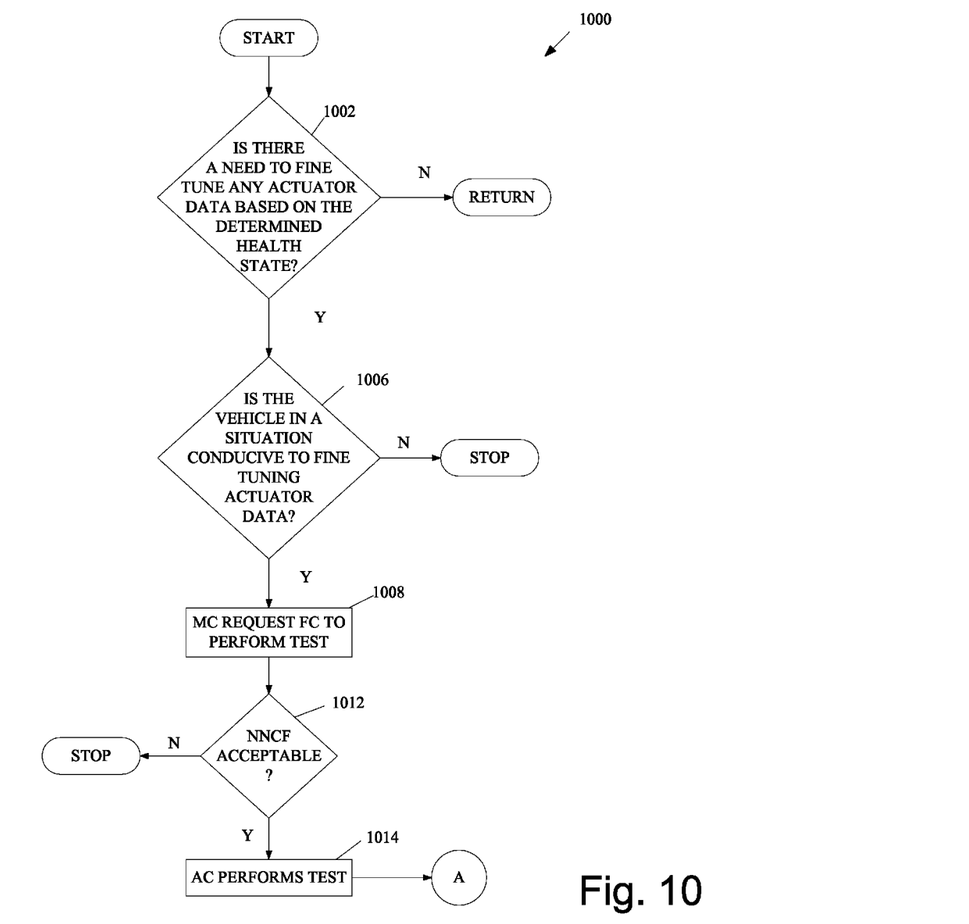

FIG. 10 illustrates a fine tuning process 1000 performed at the block 848 of FIG. 8B. In this embodiment, at a decision block 1002, the MC system 604 determines if there is a need to fine tune any actuator data based on the determined actuator health state. If fine tuning of the actuator data is not necessary, the process 1000 is returned. If fine tuning is determined to be necessary, then at a decision block 1006, the MC system 604 determines if the vehicle 602 is in a phase of a mission conducive to fine tuning an actuator 610. Examples of phases of a mission include a low observable mode, where aircraft maintaining its present attitude is vitally important for keeping its radar cross-section at a minimum, or where an aircraft is in a high-G or terrain-following situation or other flight maneuver that is not conducive to reconfiguring actuators. If it is determined at the decision block 1006 that the mission phase is not conducive, the fine tuning process 1000 is stopped.

If the mission phase does allow for fine tuning of the actuator data, then at a block 1008, the MC system 604 requests the FC system 606 to perform the fine tuning test of the associated actuator 610. Before the test is performed, the FC system 606 determines if the adaptive control correction factor is acceptable at block 1012. If the correction factor is not acceptable, the process 1000 is stopped. If the factor is acceptable, the AC component 612 performs the test/fine tuning at block 1014, and the process 1000 returns to the beginning of the process 820. An example of the test/fine tuning is an Actuator Test Injection, described more fully below.

Actuator Test Injection

During an Actuator Test Injection embodiment of a fine tuning test, the AC component 612 inserts test signals as commands to an actuator 610, while compensating with the remaining actuators 610. There are at least two uses for this. First, a suspect actuator can be exercised to confirm its health. If a control surface is commanded to sweep its range of motion and fails to do so, the FC system 606 confirms the performance failure, and then the AC component 612 is notified to permanently reconfigure. When the FC system 606 declares a complete actuator failure, control is reconfigured to remove reliance on that actuator 610. Safety, redundancy, and handling may be negatively impacted. Before the FC system 606 declares an actuator failed, confirmation via test injection is performed.

Second, the inserted test signals are developed using specific actuator loads and command sequences, such as low load with low frequency sine waves, or swept frequency sine waves with no load. Accuracy and/or confidence are significantly increased by duplicating laboratory test conditions during field use.

Parameter Identification (PID) Testing

As described above, the FC system 606 may perform PID testing. The PID testing determines vehicle expected response to each control actuator. The expected response is then compared to actual performance via a dedicated onboard vehicle model, and any divergence is attributed to a specific control surface. Output is a vector representing each control surface, and each element is characterized as nominal, degraded, or failed. To isolate control variance to a specific surface, commands to each surface/actuator are distinct. In one embodiment, artificial excitation (i.e., a very small sinusoidal signal) is added to a position command for each actuator 610, with each at a distinct frequency. In another embodiment, PID is performed only when the surfaces happen to have distinct commands, a sort of "natural excitation". PID assessment becomes opportunity driven in this case. The opportunity to test is enhanced by an interface that would make vehicle mission control element aware of the potential benefit of this testing.

Ramped Capability Reduction

When the FC system 606 has reached a valid conclusion that capability is reduced, the AC system 612 may perform a gradual change in the signals sent to an actuator 610 (i.e. a ramp from one state to another state versus an abrupt state change). The process 820 is re-executed after every performed gradual change. This allows identification of whether the information is improving or degrading control capability, confirming that the information sent to the actuator 610 is accurate and useful. Improvements may be measured by the FC system 606, by the AC system 612, or by both.

CONCLUSION

Various modules and techniques have been described in the general context of computer-executable instructions, such as program modules, executed by one or more computers or other devices. Generally, program modules include routines, programs, objects, components, data structures, and so forth for performing particular tasks. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may also be stored on or transmitted across some form of computer readable media.

Although vehicle health management systems and methods have been described in language specific to certain features and methods, it is to be understood that the features defined in the appended claims are not necessarily limited to the specific features and methods described. Rather, the specific features and methods disclosed are illustrative forms of implementing the claimed subject matter.

What is claimed is:

1. A vehicle health management system comprising:
   one or more processors;
   a mission critical software module executable by at least one processor of the one or more processors, wherein the mission critical software module is configured to receive first vehicle data from a sensor on a vehicle, the mission critical software module comprising:
   a risk assessor to determine a risk value associated with the first vehicle data;
   a confidence assessor to determine a confidence value associated with whether the first vehicle data matches a validated vehicle state; and
   a benefit assessor to determine a benefit value associated with providing the first vehicle data to a flight critical software module; and
   the flight critical software module executable by at least one processor of the one or more processors and comprising an evaluator coupled to a filter, wherein the evaluator is configured to receive, from the mission critical software module the risk value, the confidence value, and the benefit value, wherein the evaluator is configured to calculate a health score associated with the first vehicle data based on the risk value, the confidence value, and the benefit value, wherein the evaluator is configured to transfer the first vehicle data to the filter in response to the health score meeting a threshold value, wherein the filter is configured to:

determine whether the first vehicle data is internally consistent, determine whether the first vehicle data is externally consistent with second vehicle data from the sensor, and determine whether the first vehicle data is stable over time, wherein the flight critical software module is configured to provide the first vehicle data to a vehicle flight control system in response to the first vehicle data being internally consistent, externally consistent, and stable over time.

2. The vehicle health management system of claim 1, wherein the risk value includes a first value associated with a risk resulting from an actuator failure.

3. The vehicle health management system of claim 1, wherein the confidence value is determined by comparing a current vehicle state with a tested vehicle state.

4. The vehicle health management system of claim 1, wherein the first vehicle data is high fidelity data from the sensor and wherein the second vehicle data is low fidelity data from the sensor.

5. The vehicle health management system of claim 1, wherein the evaluator is configured to compare the health score with the threshold value.

6. The vehicle health management system of claim 1, wherein the first vehicle data is determined to be internally consistent by the filter when particular data fields of the first vehicle data are populated.

7. The vehicle health management system of claim 1, wherein a vehicle flight control algorithm residing in the vehicle flight control system is modified based on the first vehicle data.

8. A vehicle health management system comprising:
one or more processors;
a mission critical software module executable by at least one processor of the one or more processors to receive vehicle information from a sensor;
a gatekeeper to receive the vehicle information from the mission critical software module and to verify an accuracy of the vehicle information;
a flight critical software module executable by at least one processor of the one or more processors to receive only the vehicle information that has been verified by the gatekeeper, wherein the flight critical software module is configured to filter out a first subset of the vehicle information that is internally inconsistent to generate a data set of filtered vehicle information, wherein the flight critical software module is configured to filter out a second subset of the vehicle information that is externally inconsistent with second vehicle information from the sensor during generation of the data set of filtered vehicle information, or wherein the flight critical software module is configured to filter out a third subset of the vehicle information that is unstable over time during generation of the data set of filtered vehicle information, and wherein the flight critical software module is configured to provide the data set of filtered vehicle information to a vehicle flight control system.

9. The vehicle health management system of claim 8, wherein the flight critical software module has a higher level of validation than the mission critical software module.

10. The vehicle health management system of claim 8, wherein the gatekeeper determines one or more of a risk value, a confidence value, and a benefit value, and wherein the gatekeeper calculates a health score.

11. The vehicle health management system of claim 10, wherein the gatekeeper compares the health score to a threshold value.

12. The vehicle health management system of claim 8, wherein the vehicle information is externally inconsistent when the vehicle information received by the mission critical software module is inconsistent with the second vehicle information received from the sensor by the flight critical software module.

13. The vehicle health management system of claim 8, wherein the flight critical software module verifies vehicle state information by performing a parameter identification test, a neural net correction factor test, or both.

* * * * *